US00RE44118E

(19) United States
(12) Reissued Patent
Nishigaki

(10) Patent Number: US RE44,118 E
(45) Date of Reissued Patent: Apr. 2, 2013

(54) BACKLIGHT UNIT AND LIQUID-CRYSTAL DISPLAY DEVICE USING THE SAME

(75) Inventor: Eitaro Nishigaki, Tokyo (JP)

(73) Assignee: Getner Foundation LLC, Dover, DE (US)

(21) Appl. No.: 13/245,678

(22) Filed: Sep. 26, 2011

Related U.S. Patent Documents

Reissue of:

(64) Patent No.: 7,597,469
Issued: Oct. 6, 2009
Appl. No.: 11/705,832
Filed: Feb. 14, 2007

(30) Foreign Application Priority Data

Feb. 16, 2006 (JP) ..... 2006/038953

(51) Int. Cl.
*F21V 33/00* (2006.01)

(52) U.S. Cl. ..... 362/616; 362/613; 362/622

(58) Field of Classification Search ..... 362/615, 362/616, 621, 622, 612, 613, 606, 607, 608, 362/609

See application file for complete search history.

(56) References Cited

U.S. PATENT DOCUMENTS

| | | | |
|---|---|---|---|
| 6,039,452 | A | 3/2000 | Iimura |
| 7,040,794 | B2 | 5/2006 | Bernard |
| 7,111,974 | B2 | 9/2006 | Mizutani et al. |
| 7,128,457 | B2 | 10/2006 | Hashimoto |
| 2005/0007753 | A1 | 1/2005 | Van Hees et al. |
| 2005/0243243 | A1 | 11/2005 | Koganezawa |
| 2006/0262564 | A1 | 11/2006 | Baba |

FOREIGN PATENT DOCUMENTS

| | | | |
|---|---|---|---|
| JP | 2004-311353 | | 11/2004 |
| JP | 2004311353 | A | 11/2004 |
| JP | 2005-117023 | | 4/2005 |
| JP | 2005117023 | A | 4/2005 |

*Primary Examiner* — Laura Tso
(74) *Attorney, Agent, or Firm* — Turocy & Watson, LLP

(57) ABSTRACT

An edge-light type backlight unit reduces the color unevenness on the display screen caused by the arrangement of point-shaped light sources (e.g., LEDs) in a point-shaped light source unit comprising a set of point-shaped light sources aligned. The backlight unit includes at least one point-shaped light source unit having point-shaped light sources arranged in a single direction in a predetermined order, the light sources emitting monochromatic light of different colors. The unit further comprises a first optical filter for limiting or controlling transmission of the monochromatic light emitted from one of the light sources disposed at one end of the light source unit, and a second optical filter for limiting or controlling transmission of the monochromatic light emitted from another of the light sources disposed at the other end thereof. The first and second filters are selectively formed on a first or second light guide plate or a diffusing plate.

64 Claims, 7 Drawing Sheets

BACKLIGHT UNIT AND LIQUID-CRYSTAL DISPLAY DEVICE USING THE SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a backlight unit and a Liquid-Crystal Display (LCD) device and more particularly, to a backlight unit with point-shaped light sources such as Light-Emitting Diodes (LEDs), which is preferably applicable to LCD devices, and a LCD device using the backlight unit.

2. Description of the Related Art

In recent years, the LCD device has been extensively used as high-resolution displays. Generally, the LCD device comprises a substrate on which switching elements such as Thin-Film Transistors (TFTs) are arranged, which will be termed a "TFT substrate" below; an opposite substrate on which a color filter, a black matrix or the like are formed; and a liquid-crystal layer intervening between the TFT substrate and the opposite substrate. By changing the alignment direction of the liquid-crystal molecules in the liquid-crystal layer with the electric field generated between the pixel electrodes on the TFT substrate and the common electrode on the opposite substrate or between the common and pixel electrodes on the TFT substrate, the amount of transmitting light in the respective pixels is controlled to display images on the screen of the LCD device. The assembly comprising the TFT substrate, the opposite substrate, and the intervening liquid-crystal layer between these two substrates is termed the liquid-crystal display panel or LCD panel.

With the transmissive and semi-transmissive type LCD devices, a backlight unit is incorporated as a planer light source, because the liquid crystal per se does not emit light. The light emitted from one surface of the backlight unit, i.e., backlight, is designed in such a way as to be irradiated to the LCD panel. The backlight unit is divided into two types, the "direct type" and the "edge-light type". With the "direct type" backlight unit, linear or point-shaped light sources are arranged directly underneath the LCD panel with a predetermined layout. On the other hand, with the "edge-light type", a linear light source or sources or point-shaped light sources is/are arranged along an edge or edges of a light guide plate disposed right under the LCD panel.

With the conventional backlight units, a cold-cathode fluorescent lamp has been popularly used as a linear light source. However, a cold-cathode fluorescent lamp contains mercury (Hg) and thus, there is a problem that it gives bad effects to the environment largely. Moreover, since a cold-cathode fluorescent lamp necessitates high voltage for emitting light, there is another problem that it is likely to generate noises. Accordingly, recently, there has been a growth in the use of LEDs as a point-shaped light source.

Where LEDs are used as the light source instead of cold-cathode fluorescent lamps, obtainable luminance by a white LED for emitting white light or by a set of three LEDs for respectively emitting red, green, and blue monochromatic light is insufficient. Therefore, it is popular that a plurality of white LEDs or a set of plural red, green, and blue LEDs is linearly arranged to form a linear light source. Such the combination of LEDs as explained here is termed a "LED unit" below. This is because there is an advantage that the LED unit can be treated in designing in a similar way to the cold-cathode fluorescent lamp and therefore, the know-how and the like obtained for the cold-cathode fluorescent lamp may be applied to the LED unit.

With the direct type backlight unit, however, the obtainable luminance on the diffusing plate provided for diffusing the output light emitted from the light source varies dependent upon the location. Specifically, the obtainable luminance on the diffusing plate in the region immediately above the LED unit is higher than that in the remaining region. Thus, the luminance distribution on the display screen is likely to be uneven. Since this leads to unevenness in color and/or luminance, there is the need to adjust the said luminance distribution.

Moreover, with the LED unit formed by combining LEDs each emitting red, green, or blue monochromatic light, there is the need to mix the red, green, and blue light to generate white light. (Such the need is trivial for the LED unit formed by aligning white LEDs alone.) Therefore, it is essential to increase the distance between the LEDs and the diffusing plate to some extent. This means that the backlight unit and the LCD device incorporating the same will be large-sized.

To solve these two problems, i.e., "the non-uniformity of the luminance distribution" and "the enlargement in size", conventionally, various improvements have been made. Examples of these improvements are shown in FIGS. 1A and 1B. Both of the prior-art backlight units shown in FIGS. 1A and 1B are of the direct type, which are disclosed in the patent document 1 (Japanese Non-Examined Patent Publication No. 2004-311353 published in 2004). (See claim 1, paragraphs 0010-0026 and 0046-0049, and FIGS. 1-3 and 11.)

With the prior-art backlight unit of FIG. 1A, plate-shaped reflectors are respectively formed on the inner bottom face 101a and the inner side face of a housing 101. The reflector formed on the bottom face 101a is termed the first reflector 102. The opening 101b of the housing 101, which is opposite to the bottom face 101a, is closed or blocked by a diffusion plate 103 for transmitting and diffusing the light.

As the point-shaped light sources 104, a plurality of LEDs each emitting red (R), green (G), or blue (B) monochromatic light is combined together. The LEDs 104 are mounted on each of the point-shaped light source substrates 105 along its longitudinal direction, which is perpendicular to the paper. Here, the count of the substrates 105 is three, which are aligned at predetermined intervals. The arrangement of the LEDs 104 mounted on each of the substrates 105 is made by repetition of a specific order, for example, G, B, G, R, G, and B. Each substrate 105 is fixed on the outside of the bottom face 101a of the housing 101, and the LEDs 104 mounted on the said substrate 105 are exposed from the bottom face 101a to the inside of the housing 101 through its bottom wall.

Rectangular plate-shaped second reflectors 106, the count of which is three, are provided in the housing 101 in such a way as to be superposed on the respective substrates 105. Each of the second reflectors 106 has a reflective surface 106a opposite to the corresponding first reflector 102. The reverse of the reflective surface 106a is a regular reflection surface 106b. The second reflectors 106 are fixed on the inner side face of the housing 101 in such a way as to be approximately parallel to the first reflectors 102. A gap is formed between the side face of the housing 101 and the second reflector 106 adjacent thereto, and another gap is formed between the adjoining second reflectors 106. Thus, the light emitted from the point-shaped light sources 104 can reach the side of the diffusing plate 103 by way of these gaps.

With the prior-art backlight unit having the above-described configuration of FIG. 1A, the R, G, and B monochromatic light beams emitted from the LEDs or point-shaped light sources 104 are directly reflected by the first reflector 102 and then, reflected by the reflective surfaces 106a of the second reflectors 106. Alternately, these light beams are reflected by the reflective surfaces 106a of the second reflectors 106, and reflected by the first reflector 102 and thereafter, reflected again by the reflective surfaces 106a. In this way, these monochromatic light beams are repeatedly reflected and propagated between the first reflector 102 and the second reflectors 106 and as a result, they are mixed together and uniformized to white light. The white light thus generated will reach the diffusing plate 103 by way of the gaps between the side face of the housing 101 and the second reflectors 106 and the gaps between the adjoining second reflectors 106.

The light incident on the diffusing plate 103 is divided into a component that penetrates through the inside of the diffusing plate 103 and another component that is reflected by the particles in the diffusing plate 103 toward the side of the point-shaped light sources 104. The reflected component of the said light is reflected by the first reflector 102 or the regular reflection surfaces 106b of the second reflectors 106 and is incident again on the plate 103. The outgoing light from the diffusing plate 103 will radiate from its surface in all directions uniformly.

As explained above, the R, G, and B monochromatic light emitted from the LEDs 104 are repeatedly reflected and propagated in the space between the first reflector 102 and the second reflectors 106 and therefore, sufficient distances for mixture to white light are obtained. As a result, the color unevenness of the LCD device can be prevented from occurring without enlargement in size.

In addition, conventionally, the luminance in the region immediately above the LEDs (i.e., the point-shaped light sources) 104 is higher than that in the remaining or surrounding region thereof and thus, the luminance distribution on the display screen is likely to be uneven. Unlike this, with the prior-art backlight unit of FIG. 1A, because the second reflectors 106 are provided between the LEDs 104 and the first reflector 102, such the luminance unevenness can be suppressed.

The prior-art backlight unit shown in FIG. 1B has the same configuration as the prior-art backlight unit shown in FIG. 1A except that patterned light-shielding layers 110a are selectively printed on a surface (i.e., the inner surface in FIG. 1B) of the diffusing plate 103. Each of the light-shielding layers 110a has a diffuse reflection function of incident light. Each of the light-shielding layers 110a is located in the area to which the light is irradiated through the gaps between the side face of the housing 101 and the second reflector 106 adjacent thereto and the gaps formed between the adjoining second reflectors 106. The light-shielding layers 110a are formed by vacuum evaporation or silk printing of aluminum (Al). The size, density and gradation of the ink dots and/or the deposited patterns constituting the layers 110a are adjusted to realize uniform luminance distribution.

With the prior-art backlight unit of FIG. 1B, the light passing through the gaps between the side face of the housing 101 and the second reflector 106 adjacent thereto and the gaps between the adjoining second reflectors 106 reaches the light-shielding layers 110a and is diffuse-reflected by the layers 110a and then, further diffused in the housing 101. Thus, the luminance unevenness and color unevenness are more likely to be suppressed than the prior-art backlight unit of FIG. 1A.

Moreover, although not shown, still another prior-art direct type backlight unit is disclosed in the patent document 2 (Japanese Non-Examined Patent Publication No. 2005-117023 published in 2005). (See claim 1, paragraphs 0129-0131 and 0143-0147, and FIGS. 17 and 24.) This backlight unit comprises a similar structure to the patterned light-shielding layers 110a of the prior-art backlight unit of FIG. 1B.

With the structure shown in FIGS. 17 and 24 of the patent document 2, a plurality of LED units are arranged at intervals on the inner bottom surface of a housing. Each of the LED units comprises LEDs aligned regularly. A diffusing plate is fixed at the mouth of the housing located on the opposite side to the bottom surface. A diffusing light guide plate is provided between the bottom surface and the diffusing plate. Patterned light-controlling dots are formed on a surface of the diffusing light guide plate. Each of the light-controlling dots is placed in a one-on-one relationship with an opposing one of the LEDs. These dots are formed by printing with ink.

Each of the light-controlling dots reflects the incident light due to the reflection property of the ink. At the same time, each of the dots diffuse-reflects the incident light efficiently due to the shielding property of the light-shielding agent added to the ink and the diffusion property of the diffusing agent added thereto. Accordingly, generation of high-luminance regions termed the lamp images is prevented, in other words, luminance unevenness is suppressed, which results in equalized luminance.

Moreover, because of the light-controlling dots, the light penetrating through the diffusing light guide plate exhibits high color mixing property. Therefore, the color unevenness of the resultant light is suppressed significantly.

With any of the above-described prior-art direct type backlight units, luminance unevenness and color unevenness can be suppressed without enlargement in size. However, as long as a set of LEDs (i.e., point-shaped light sources) emitting red, green, and blue monochromatic light is used in combination, it is inevitable that color unevenness is left on the display screen in accordance with the placement order of the LEDs in the set. For example, if a red LED emitting red light is placed at one end of the LED unit, color mixture is difficult to occur with respect to the red LED. This is because a green or blue LED is not placed adjacent to the said red LED on one side thereof. Therefore, the corresponding position on the display screen to the said red LED contains some redness compared with the other positions.

The above problem of color unevenness for the direct type backlight unit will occur in the edge-light type backlight unit. In particular, this phenomenon is more likely to occur if the edge-light type backlight unit comprises a single LED unit formed by a set of red, green and blue LEDs aligned in a single direction. This is because the light emitted from the respective LEDs of plural LED units is unable to be mixed together.

Furthermore, since all the above-described prior-art backlight units are of the direct type, the patterned light-shielding layers and the patterned light-controlling dots used therein are not easily applied to the edge-light type backlight units.

SUMMARY OF THE INVENTION

Accordingly, an object of the present invention is to provide an edge-light type backlight unit that reduces the color unevenness on the display screen caused by the arrangement of point-shaped light sources in a point-shaped light source unit comprising a set of the aligned point-shaped light sources, and a LCD device using the backlight unit.

The above object together with others not specifically mentioned will become clear to those skilled in the art from the following description.

According to a first aspect of the present invention, an edge-light type backlight unit is provided, which comprises:

at least one point-shaped light source unit having point-shaped light sources arranged in a single direction in a predetermined order, the light sources emitting monochromatic light of different colors;

a first light guide plate, which has a light incident surface and a light exiting surface, for receiving monochrome light emitted from the respective light sources of the light source unit at the light incident surface and guiding the said light to the light exiting surface;

a reflector for reflecting the light exiting from the light exiting surface of the first light guide plate;

a second light guide plate, which has a light incident surface and a light exiting surface, for receiving the light reflected by the reflector at the light incident surface of the second light guide plate and guiding the said light to the light exiting surface of the second light guide plate;

a diffusing plate for receiving the light exiting from the light exiting surface of the second light guide plate, diffusing the said light, and emitting the said light diffused;

a first optical filter for limiting or controlling transmission of the monochromatic light emitted from one of the light sources disposed at one end of the light source unit; and a second optical filter for limiting or controlling transmission of the monochromatic light emitted from another of the light sources disposed at the other end of the light source unit;

wherein the first optical filter and the second optical filter are selectively formed on one of the first light guide plate, the second light guide plate, and the diffusing plate.

With the backlight unit according to the first aspect of the present invention, at least one point-shaped light source unit having point-shaped light sources arranged in a single direction in a predetermined order is provided, where the point-shaped light sources emit monochromatic light of different colors. Thus, if the first optical filter and the second optical filter are not provided, it is inevitable that color unevenness is left on the display screen in accordance with the placement order of the point-shaped light sources in the light source unit.

However, the first optical filter and the second optical filter are selectively formed on one of the first light guide plate, the second light guide plate, and the diffusing plate. The first optical filter limits or controls transmission of the monochromatic light emitted from one of the light sources disposed at one end of the light source unit. The second optical filter limits or controls transmission of the monochromatic light emitted from another of the light sources disposed at the other end of the light source unit.

Therefore, the effect given by the monochromatic light emitted from the light sources disposed at each end of the light source unit is limited or controlled effectively.

In this way, with the backlight unit according to the first aspect of the present invention, by selectively providing the first and second optical filters on one of the first light guide plate, the second light guide plate, and the diffusing plate, penetration or transmission of the colored light causing the color unevenness (which is due to the arrangement or sequence of the point-shaped light sources) is limited or controlled, thereby decreasing the said color unevenness. As a result, the color unevenness on the display screen can be reduced effectively with a very simple structure.

In a preferred embodiment of the backlight unit according to the first aspect of the present invention, the first and second optical filters are located on the light exiting surface of the first light guide plate. In this embodiment, it is preferred that the first and second optical filters are respectively located at or near two ends of the light exiting surface of the first light guide plate, respectively.

In another preferred embodiment of the backlight unit according to the first aspect of the present invention, the first and second optical filters are located on the light incident surface of the second light guide plate. In this embodiment, it is preferred that the first and second optical filters are respectively located at or near two ends of the light incident surface of the second light guide plate.

In still another preferred embodiment of the backlight unit according to the first aspect of the present invention, the first and second optical filters are located on the light exiting surface of the second light guide plate. In this embodiment, it is preferred that the first and second optical filters are respectively located at or near two ends of the light exiting surface of the second light guide plate.

In a further preferred embodiment of the backlight unit according to the first aspect of the present invention, the first and second optical filters are located on one surface of the diffusing plate. In this embodiment, it is preferred that the first and second optical filters are respectively located at or near two ends of the surface of the diffusing plate.

In a still further preferred embodiment of the backlight unit according to the first aspect of the present invention, the count of the light source unit is unity. In this embodiment, the advantage of the invention is exhibited remarkably. Specifically, if the count of the point-shaped light source unit is two or more, the color deviation caused by the monochromatic light from the point-shaped light sources located at each end of the respective light source units can be relaxed by differentiating the arrangement or sequence of the point-shaped light sources in the light source units and placing them adjacently. However, if the count of the point-shaped light source unit is unity, such the measure is impossible to be realized. The effect by the said color deviation will appear conspicuously. With the backlight unit according to the first aspect of the present invention, however, the said color deviation can be effectively relaxed even if the count of the point-shaped light source unit is unity.

According to a second aspect of the present invention, a LCD device is provided, which comprises:

the backlight device according to the first aspect of the invention; and a liquid-crystal display panel to which the light emitted from the backlight unit is to be irradiated.

With the LCD device according to the second aspect of the present invention, since the backlight unit according to the first aspect of the invention is included, the color unevenness on the display screen can be effectively reduced.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1A:
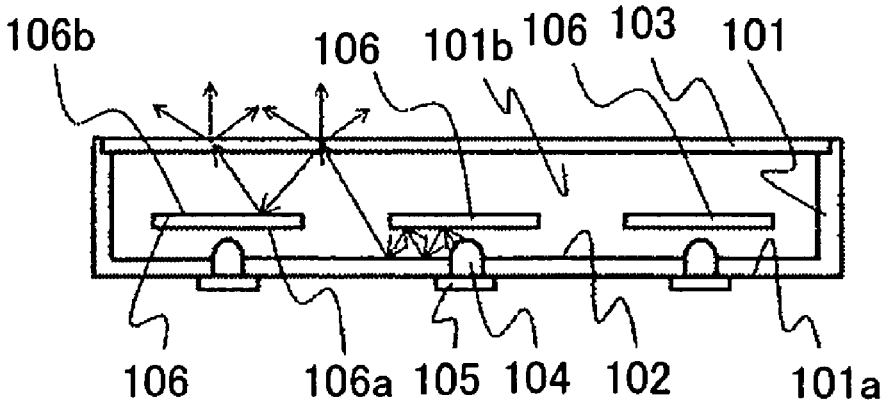
FIG. 1A PRIOR ART
FIG. 1A is a schematic partial cross-sectional view showing the configuration of a prior-art direct type backlight unit.
Figure 1B:
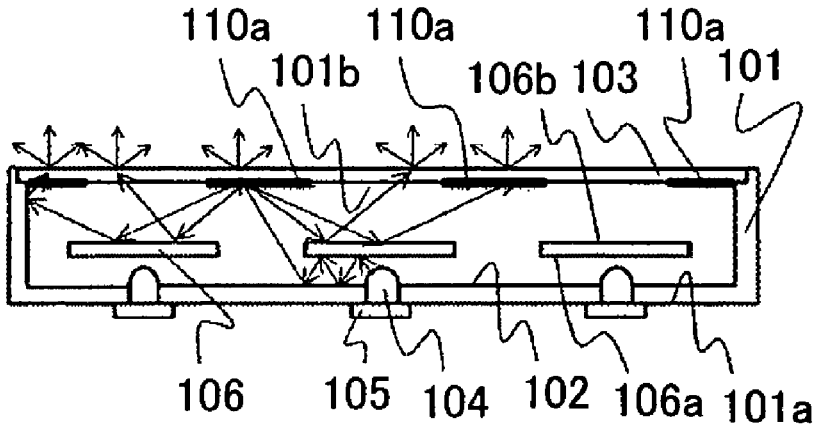
FIG. 1B PRIOR ART
FIG. 1B is a schematic partial cross-sectional view showing the configuration of another prior-art direct type backlight unit.

Preferred embodiments of the present invention will be described in detail below while referring to the drawings attached.

First Embodiment

Figure 2:
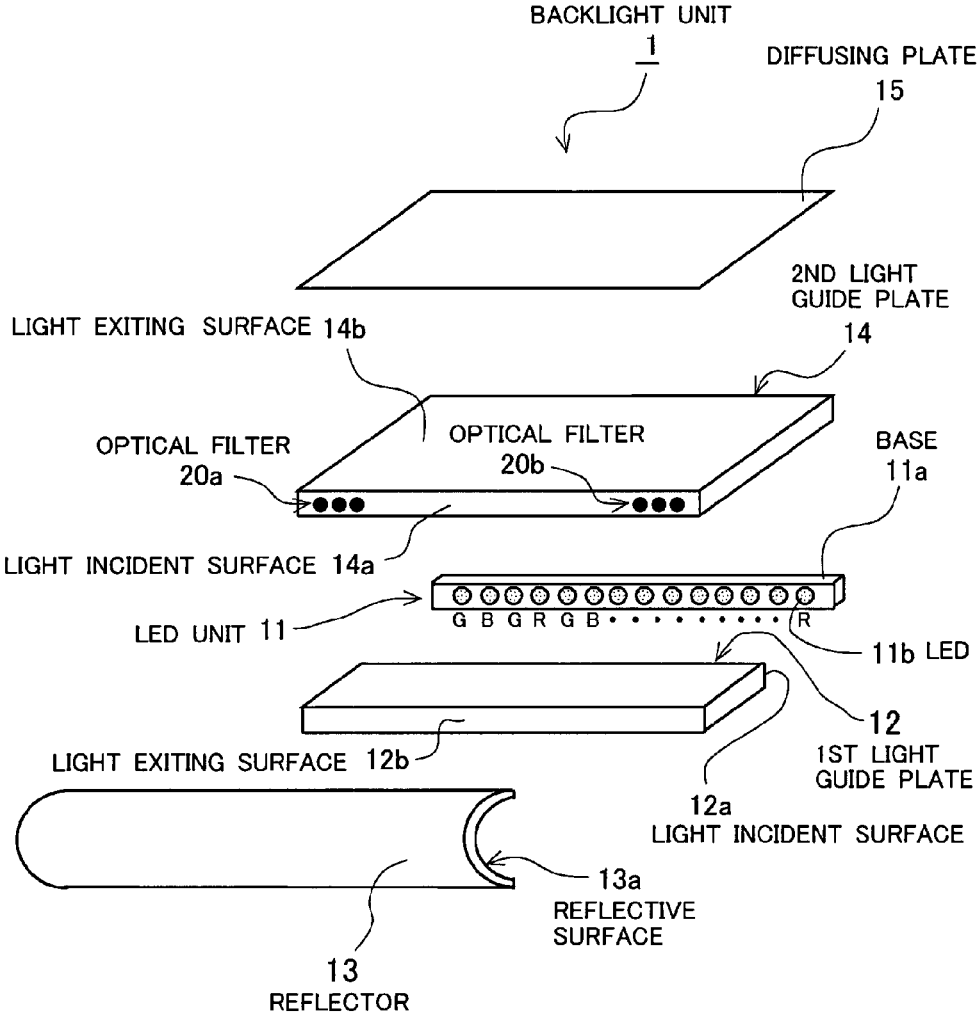
FIG. 2 is a schematic perspective exploded view showing the configuration of the main part of an edge-light type backlight unit according to a first embodiment of the present invention.
Figure 3:
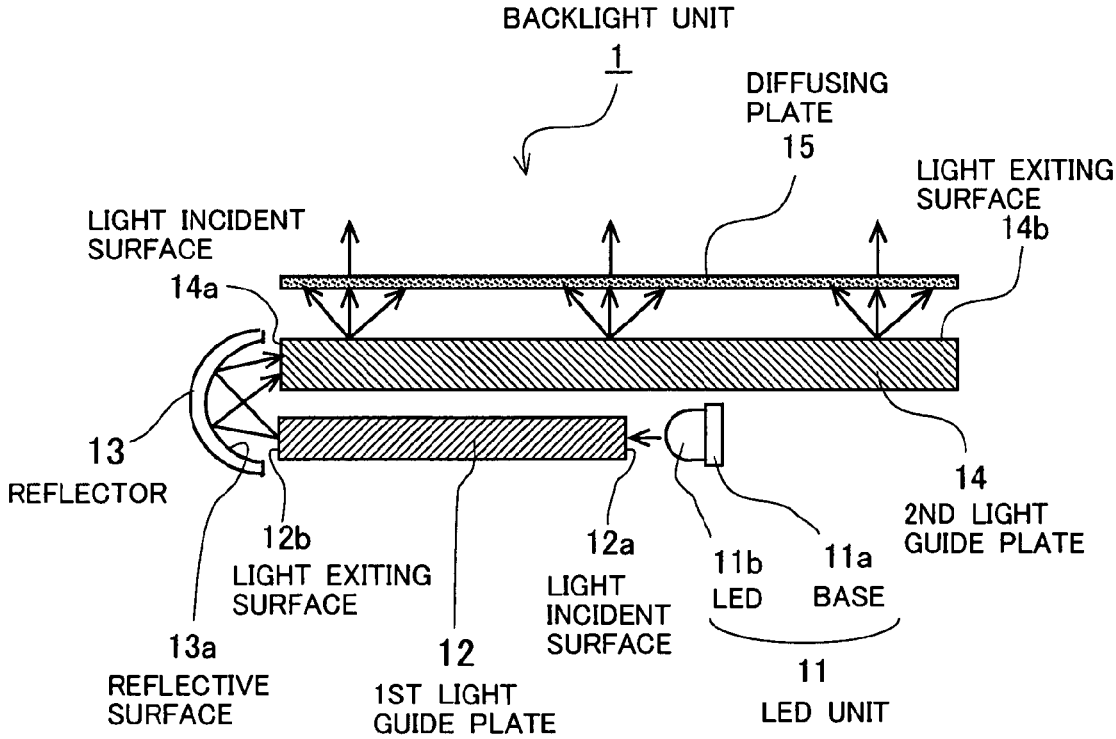
FIG. 3 is a schematic cross-sectional view showing the configuration of the main part of the backlight unit according to the first embodiment of FIG. 2.

FIGS. 2 and 3 schematically show the configuration of a backlight unit 1 according to a first embodiment of the present invention.

As shown in FIGS. 2 and 3, the backlight unit 1 according to the first embodiment, which is of the edge-light type, comprises a LED unit 11 into which a plurality of LEDs 11b are incorporated as point-shaped light sources. The unit 1 further comprises a rectangular first light guide plate 12, an approximately hemicylindrical reflector 13, a rectangular second light guide plate 14, and a rectangular diffusing plate 15. These optical members are fixed by a housing or frame (not shown) to have the configuration shown in FIG. 3.

Each of the LEDs 11b of the LED unit 11 emits red, green, or blue monochromatic light. These LEDs 11b are aligned and fixed on a base 11a at equal intervals in a predetermined order or sequence. The base 11a is formed by a belt-shaped rigid plate. For example, the LEDs 11b are aligned from one end of the base 11a (i.e., the LED row) to the other end thereof in the order of G, B, G, R, G, B, . . . , R. This means that the LED 11a emitting green (G) light is located at one end of the base 11a (at the left end in FIG. 2), and the LED 11a emitting red (R) light is located at the other end of the base 11a (at the right end in FIG. 2).

The LED unit 11 is fixed near the light incident surface 12a of the first light guide plate 12 to have a predetermined gap therebetween. The light incident surface (or the light incident end face) 12a is formed on one of the two longer side faces of the plate 12. The LED unit 11 is extended parallel to the light incident surface 12a. Thus, the LEDs 11b are aligned along the light incident surface 12a in the above-described order. The red, green or blue monochromatic light emitted from each of the LEDs 11b enters the inside of the first light guide plate 12 by way of the light incident surface 12a. Then, the red, green and blue light from the LEDs 11b propagates through the inside of the first light guide plate 12, and exits from the light exiting surface (or the light exiting end face) 12b of the plate 12 to the outside. The light exiting surface 12b is formed on the other of the two longer side faces of the plate 12, which is opposite to the light incident surface 12a.

Appropriate processing has been applied to the other surfaces of the first light guide plate 12 than the light incident and exiting surfaces 12a and 12b by a known method in such a way that the light propagating in the plate 12 is reflected. Thus, the light that has entered the inside of the plate 12 through the light incident surface 12a is reflected repeatedly due to total internal reflection on the reflection-processed surfaces of the plate 12, and propagates toward the light exiting surface 12b, outgoing or exiting through the light exiting surface 12b.

The second light guide plate 14 and the first light guide plate 12 are arranged and fixed in parallel to each other to have a minute gap therebetween. In FIG. 3, the second light guide plate 14 is located over the first light guide plate 12. The first and second light guide plates 12 and 14 are located in such a way that the light exiting surface 12b of the first light guide plate 12 and the light incident surface (or the light incident end face) 14a of the second light guide plate 14 are superposed (aligned) on each other. The light incident surface 14a of the second light guide plate 14 is formed on one of the two longer side faces thereof. Since the second light guide plate 14 is larger than the first light guide plate 12, the first light guide plate 12 is entirely covered with the second light guide plate 14.

The reflector 13 is fixed near the light exiting surface 12b of the first light guide plate 12 and the light incident surface 14a of the second light guide plate 14 in such a way as to extend along these two surfaces 12b and 14a. As shown in FIG. 3, an approximately hemicylindrical reflective surface 13a of the reflector 13, which is located inside the reflector 13, is opposed to the surfaces faces 12b and 14a. The reflective surface 13a reflects the light emitted from the light exiting surface 12b of the first light guide plate 12 and make the said light enter the second light guide plate 14 by way of its light incident surface 14a.

Similar to the first light guide plate 12, appropriate processing has been applied to the other surfaces of the second light guide plate 14 than the light incident surface 14a and the planar light exiting surface 14b by a known method in such a way that the light propagating in the plate 14 is reflected. Thus, the light that has entered the inside of the plate 14 through the light incident surface 14a is reflected repeatedly due to total internal reflection on the reflection-processed surfaces of the plate 14, and propagates in the plate 14, outgoing from the light exiting surface 14b toward the diffusing plate 15 (upward in FIG. 3).

The diffusing plate 15, which is located on the opposite side to the first light guide plate 12 with respect to the second light guide plate 14, is parallel to the second light guide plate 14 to be apart from the plate 14 at a predetermined distance. One surface of the diffusing plate 15 is opposed to the light exiting surface 14b of the second light guide plate 14. The light emitted from the light exiting surface 14b of the plate 14 to enter the diffusing plate 15 is diffused in the plate 15 and then, is irradiated to a LCD panel (not shown) in the form of collimated light.

On the light incident surface 14a of the second light guide plate 14, as clearly shown in FIG. 2, an optical filter 20a and an optical filter 20b are selectively formed to limit or control the color unevenness occurring on the display screen of a LCD device. The filter 20a is located at or near one end (the left-side end in FIG. 3) of the light incident surface 14a, and the filter 20b is located at or near the other end (the right-side end in FIG. 3) thereof. The filter 20a limits or controls the transmission of the light radiated from the LED 11b at or near one end (the left-side end in FIG. 2) of the LED unit 11. On the other hand, the filter 20b limits or controls the transmission of the light radiated from the LED 11b at or near the other end (i.e., the right-side end in FIG. 2) of the LED unit 11. Each of the filters 20a and 20b has a predetermined width along the light incident surface 14a. The width of the filter 20a may be the same as or different from that of the filter 20b. The filters 20a and 20b are apart from each other at a predetermined distance.

The reason why the optical filters 20a and 20b are provided on the light incident surface 14a of the second light guide plate 14 is as follows. Specifically, the backlight unit 1 according to the first embodiment comprises the LED unit 11 having the LEDs 11b arranged in a single direction (i.e., along the elongated base 11a in FIG. 2) in the predetermined order or sequence, where each of the LEDs 11b emits monochromatic light of red, green or blue. The green LED 11b is located at one end (i.e., the left-side end in FIG. 2) of the LED unit 11 and the red LED 11b is located at the other end (i.e., the right-side end) thereof. Therefore, green and red colors are likely to be excessive or stronger in the neighborhoods of each end (i.e., the left- and right-side ends) of the LED unit 11, respectively. In other words, color deviation will take place in these neighborhoods. As a result, color unevenness will occur on the display screen due to the said color deviation. However, with the backlight unit 1 of the first embodiment, the filters 20a and 20b operate to cancel the color deviation and thus, the color unevenness on the screen is restrained or eliminated.

The formation method of the filters 20a and 20b is not limited. Any method may be used for this purpose. For example, an ink that limits or controls the transmission of light of a desired color may be printed on the light incident surface 14a of the second light guide plate 14 to form a predetermined pattern or patterns. Alternately, a patterned colored sheet or sheets or the like that limits or controls the transmission of light of a desired color may be adhered on the light incident surface 14a, or a material for the colored sheet (s) may be selectively coated on the surface 14a. Here, each of the filters 20a and 20b is formed by a set of dots. However, the shape or pattern of the filters 20a and 20b is not limited to this. The filters 20a and 20b may have any other shape or pattern such as linear (or, strip-shaped) and planar ones. In short, it is sufficient for the filters 20a and 20b that the transmission of light of a desired color is limited or controlled in the regions where the filter 20a and 20b are formed, respectively.

To find what color of light is to be limited or controlled and how much the light needs to be limited or controlled, for example, the following method is preferably used. Specifically, all the LEDs 11b of the LED unit 11 are activated by driving the LED unit 11 in the state where the optical filters 20a and 20b are not formed, thereby emitting light from all the LEDs 11b. Then, the light radiated from the diffusing plate 15 (i.e., backlight) due to the light from the LEDs 11b is irradiated to the LCD panel. During that time, color unevenness occurring on the display screen is examined or researched. As a result, it is known what color of light is excessive and how much the color exceeds in the neighborhood of each end of the screen. The color of light thus found ought to reflect the color of light emitted from the LED 11b located at each end of the LED unit 11. Thereafter, an appropriate light-transmission limiting or controlling material that brings the transmission amount of light of the excessive color near zero as much as possible is selectively applied to each of the required regions on the light incident surface 14a of the second light guide plate 14, thereby forming the optical filters 20a and 20b.

Next, the operation of the backlight unit 1 having the above-described configuration is explained below.

When the power of the backlight unit 1 is turned on, red, green, or blue monochromatic light is emitted from each of the LEDs 11b of the LED unit 11 toward the light incident surface 12a of the first light guide plate 12. The red, green and blue monochromatic light thus emitted enters the inside of the first light guide plate 12 by way of the light incident surface 12a. Then, the said light is reflected repeatedly in the plate 12 due to total internal reflection and propagates to the light exiting surface 12b, exiting from the said face 12b. The said red, green and blue light is somewhat mixed together in the plate 12; however, such the color mixture is insufficient and the effect by the arrangement (order) of the LEDs 11b remains. Specifically, green color is somewhat excessive or stronger in the neighborhood of one end (i.e., the left-side end in FIG. 2) of the light exiting surface 12 and at the same time, red color is somewhat excessive or stronger in the neighborhood of the other end (i.e., the right-side end in FIG. 2) thereof. In the remaining region (in the central part in FIG. 2) other than the neighborhoods of these two ends of the light exiting surface 12, the said red, green and blue light is considerably mixed together and as a result, it will be near white light.

The light emitted from the light exiting surface 12 of the first light guide plate 12 is reflected by the reflective surface 13a of the reflector 13 to enter the inside of the second light guide plate 14 through the light incident surface 14a thereof. At that time, due to the optical filter 20a that limits or controls the transmission of green light and the optical filter 20b that limits or controls the transmission of red light, which are formed respectively at or near the two ends of the light incident surface 14a, the amounts of the transmitted green and red light are reduced. This means that the amounts of the green and red light incident on the surface 14a are respectively decreased by the filters 20a and 20b in the neighborhoods of the two ends of the surface 14a. Accordingly, in the second light guide plate 14, the color deviation of the outgoing or exiting light from the first light guide plate 12 is limited or controlled.

The light that has entered the inside of the second light guide plate 14 is reflected repeatedly due to total internal reflection and propagates in the inside of the plate 14. During that time, the red, green and blue light is further mixed together to be an approximately uniform white light. Thereafter, the approximately uniform white light thus generated exits upward from the planar light exiting surface 14b of the plate 14 toward the diffusing plate 15, as shown in FIG. 3. With the backlight unit 1 according to the first embodiment of the invention shown in FIGS. 2 and 3, as explained above, the LED unit 11 with the LEDs 11b emitting red, green and blue light is provided. The green LED 11b is located at or near one end (i.e., the left-side end in FIG. 2) of the LED unit 11, and the red LED 11b is located at or near the other end (i.e., the right-side end in FIG. 2) thereof. All the LEDs 11b of the unit 11 are aligned along the light incident surface 12a of the first light guide plate 12. For this reason, if the optical filters 20a and 20b are not provided, green color will be excessive or stronger in one side of the display screen and at the same time, red color will be excessive or stronger in the other side thereof compared with the remaining region (i.e., the central part) of the screen in accordance with the placement order of the LEDs 11b in the LED unit 11. As a result, color unevenness or color deviation will occur on the screen.

However, the backlight unit 1 comprises the filter 20a that limits or controls the transmission of the green light at or near the left-side end of the light incident surface 14a of the second light guide plate 14 and the filter 20b that limits or controls the transmission of the red light at or near the right-side end thereof. Therefore, the effect by the green light emitted from the green LED 11b at the left-side end of the LED unit 11 and the red light emitted from the red LED 11b at the right-side end thereof can be limited or restrained effectively with a very simple structure. Accordingly, the color unevenness on the display screen can be reduced.

Moreover, since the backlight unit 1 is of the edge type, the size of the unit 1 is not enlarged for color mixture, which is unlike the direct type backlight unit.

In addition, by combining the backlight unit 1 according to the first embodiment with a known LCD panel, a LCD device having less color unevenness can be fabricated.

Second Embodiment

Figure 4:
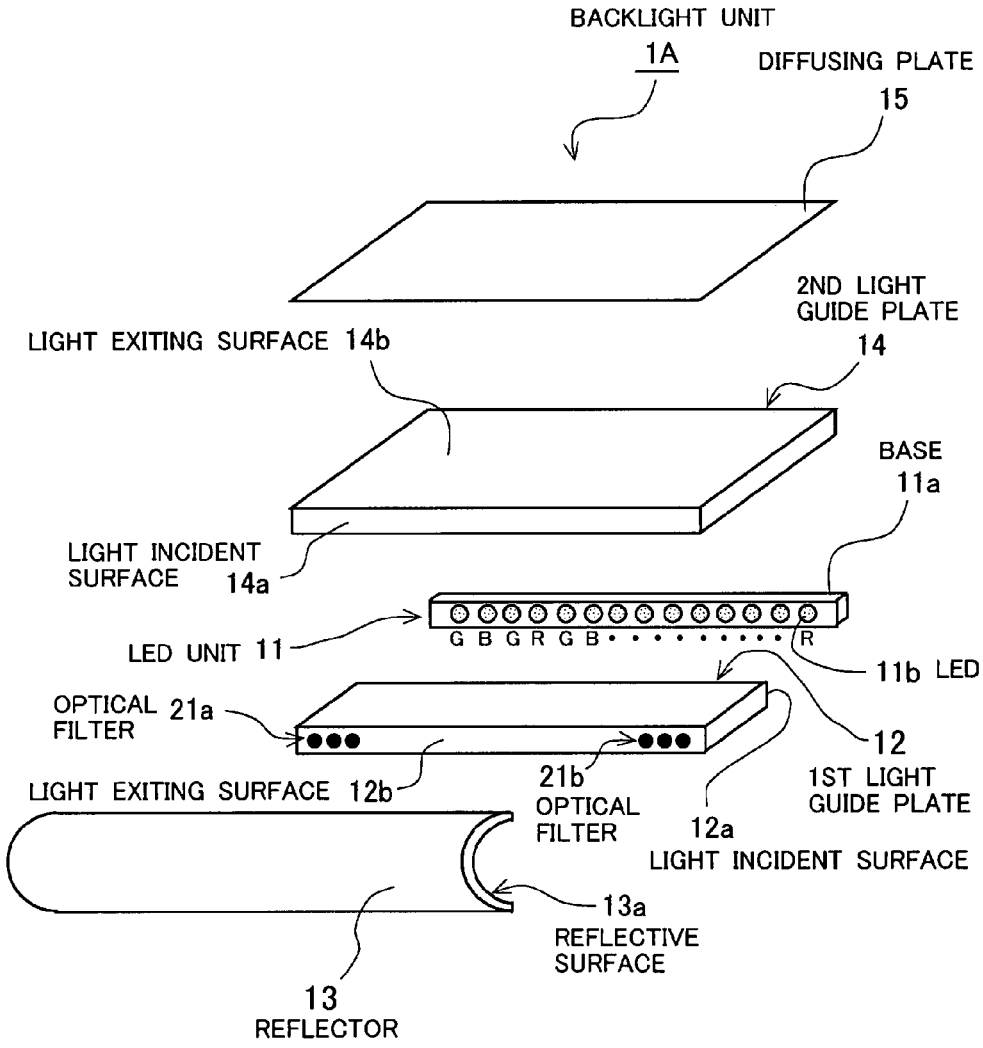
FIG. 4 is a schematic perspective exploded view showing the configuration of the main part of an edge-light type backlight unit according to a second embodiment of the present invention.

FIG. 4 schematically shows the configuration of a backlight unit 1A according to a second embodiment of the present invention.

The backlight unit 1A of the second embodiment has the same configuration as the backlight unit 1 of the first embodiment of FIGS. 2 and 3 except that optical filters 21a and 21b are selectively formed on the light exiting surface 12b of the first light guide plate 12, instead of the optical filters 20a and 20b formed on the light incident surface 14a of the second light guide plate 14 in the first embodiment. Therefore, explanation about the same configuration as the backlight unit 1 according to the first embodiment is omitted here by attaching the same reference numerals as those of the first embodiment to the same or corresponding elements.

In this way, like the backlight unit 1 according to the first embodiment, the backlight unit 1A according to the second embodiment comprises the LED unit 11 with the LEDs 11b emitting red, green and blue light is provided. The green LED 11b is located at the left-side end of the LED unit 11 and the red LED 11b is located at the right-side end thereof. All the LEDs 11b of the unit 11 are aligned along the light incident surface 12a of the first light guide plate 12. For this reason, if the filters 21a and 21b are not provided, green and red colors will be excessive or stronger in or near each side of the display screen compared with the remaining region (i.e., the central part) of the screen in accordance with the placement order of the LEDs 11b in the unit 11. As a result, color unevenness or color deviation will occur on the screen.

However, with the backlight unit 1A, the filter 21a that limits or controls the transmission of the green light is selectively formed at or near the left-side end of the light exiting surface 12b of the first light guide plate 12 while the filter 21b that limits or controls the transmission of the red light is selectively formed at or near the right-side end thereof. Each of the filters 21a and 21b has a predetermined width along the light exiting surface 12b. Therefore, the effect by the green and red light emitted from the green and red LEDs 11b at each end of the LED unit 11 can be limited or restrained effectively. Accordingly, the color unevenness on the display screen can be reduced with a very simple structure.

In addition, by combining the backlight unit 1A according to the second embodiment with a known LCD panel, a LCD device having less color unevenness can be fabricated.

Third Embodiment

Figure 5:
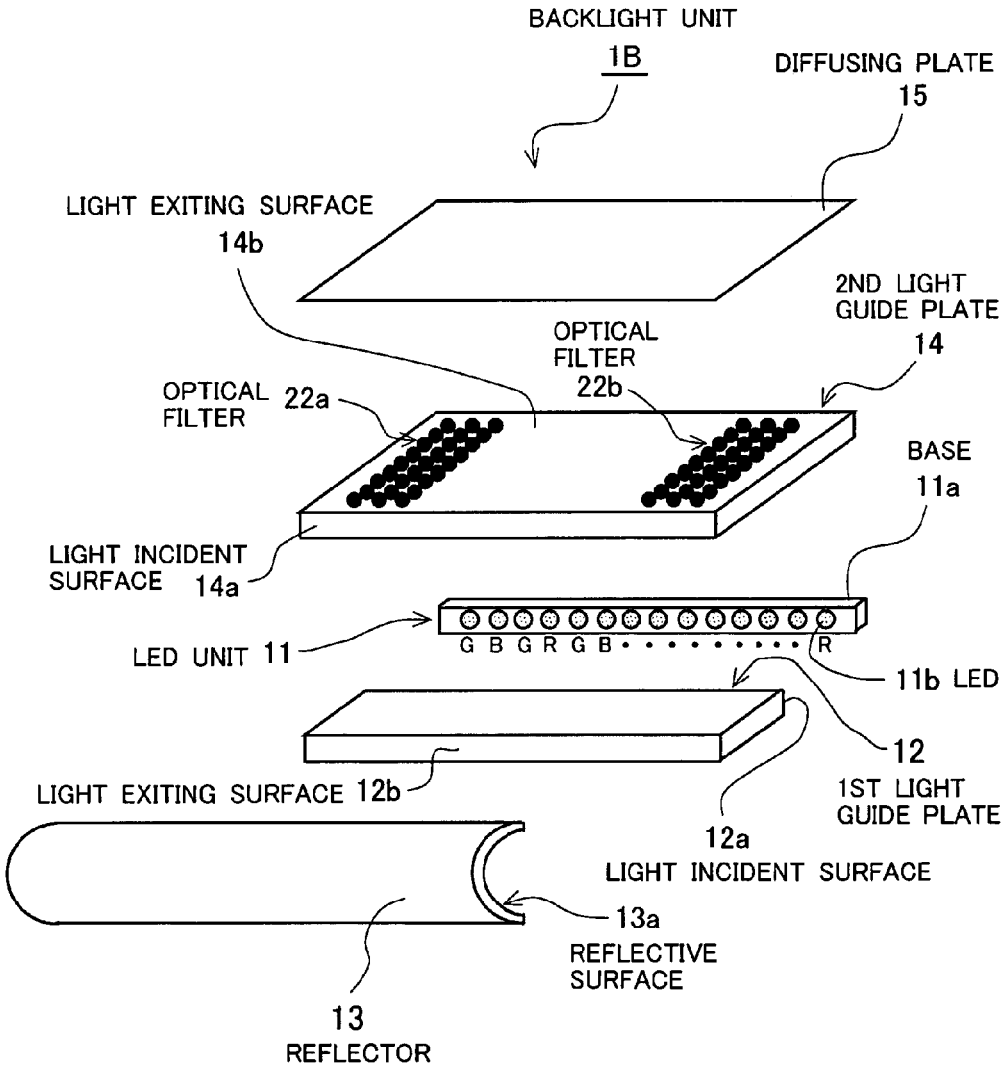
FIG. 5 is a schematic perspective exploded view showing the configuration of the main part of an edge-light type backlight unit according to a third embodiment of the present invention.

FIG. 5 schematically shows the configuration of a backlight unit 1B according to a third embodiment of the present invention.

The backlight unit 1B has the same configuration as the backlight unit 1 according to the first embodiment of FIGS. 2 and 3 except that optical filters 22a and 22b are selectively formed on the planar light exiting surface 14b of the second light guide plate 14, instead of the optical filters 20a and 20b formed on the light incident surface 14a of the second light guide plate 14 in the first embodiment. Therefore, explanation about the same configuration as the backlight unit 1B according to the third embodiment is omitted here by attaching the same reference numerals as those of the first embodiment to the same or corresponding elements.

With the backlight unit 1B, as shown in FIG. 5, the filter 22a that limits or controls the transmission of the green light is selectively formed at or near the left-side end of the light exiting surface 14b of the second light guide plate 14, and the filter 22b that limits or controls the transmission of the red light is selectively formed at or near the right-side end thereof. The filter 22a is extended along the left-side end (i.e., the left-side shorter edge) of the surface 14b to have a predetermined width. The filter 22b is extended along the right-side end (i.e., the right-side shorter edge) of the surface 14b to have a predetermined width. The filters 22a and 22b are apart from each other at a predetermined distance. Therefore, the effect by the green and red light emitted from the green and red LEDs 11b at each end of the LED unit 11 can be limited or restrained effectively. Accordingly, the color unevenness on the display screen can be reduced with a very simple structure.

In addition, by combining the backlight unit 1B according to the third embodiment with a known LCD panel, a LCD device having less color unevenness can be fabricated.

Fourth Embodiment

Figure 6:
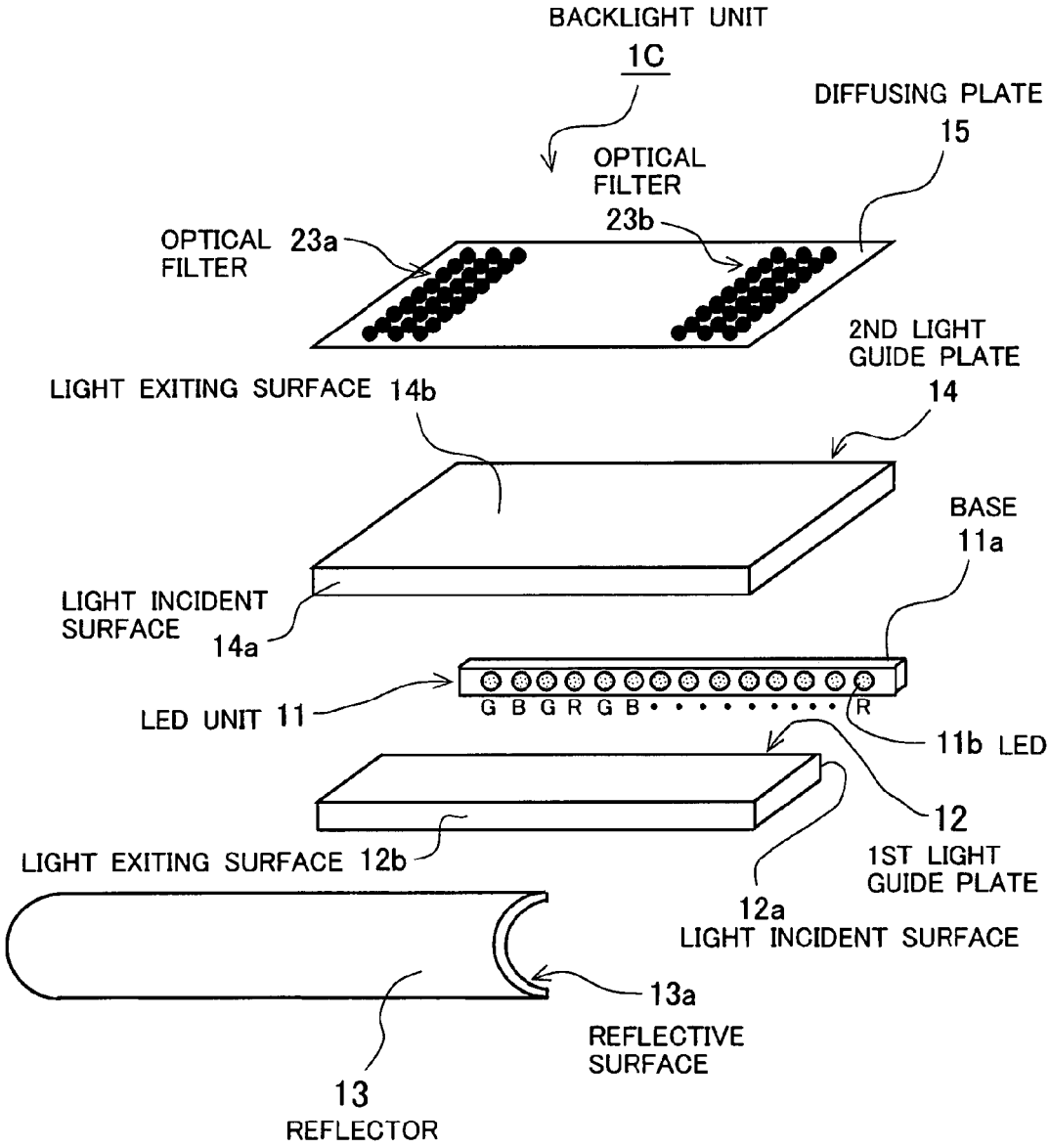
FIG. 6 is a schematic perspective exploded view showing the configuration of the main part of an edge-light type backlight unit according to a fourth embodiment of the present invention.

FIG. 6 schematically shows the configuration of a backlight unit 1C according to a fourth embodiment of the present invention.

The backlight unit 1C has the same configuration as the backlight unit 1 according to the first embodiment of FIGS. 2 and 3 except that optical filters 23a and 23b are selectively formed on one surface (i.e., an incident or exiting surface) of the diffusing plate 15 instead of the optical filters 20a and 20b formed on the light incident surface 14a of the second light guide plate 14 in the first embodiment. Therefore, explanation about the same configuration as the backlight unit 1 according to the first embodiment is omitted here by attaching the same reference numerals as those of the first embodiment to the same or corresponding elements.

With the backlight unit 1C, as shown in FIG. 6, the filter 23a that limits or controls the transmission of the green light is selectively formed at or near the left-side end of the surface of the diffusing plate 15, and the filter 23b that limits or controls the transmission of the red light is selectively formed at the right-side end thereof. The filter 23a is extended along the left-side end (i.e., the left-side shorter edge) of the surface of the plate 15 to have a predetermined width. The filter 23b is extended along the right-side end (i.e., the right-side shorter edge) of the surface of the plate 15 to have a predetermined width. The filters 23a and 23b are apart from each other at a predetermined distance. Therefore, the effect by the green and red light emitted from the green and red LEDs 11b at each end of the LED unit 11 can be limited or restrained effectively. Accordingly, the color unevenness on the display screen can be reduced with a very simple structure.

In addition, by combining the backlight unit 1C according to the fourth embodiment with a known LCD panel, a LCD device having less color unevenness can be fabricated.

Fifth Embodiment

Figure 7:
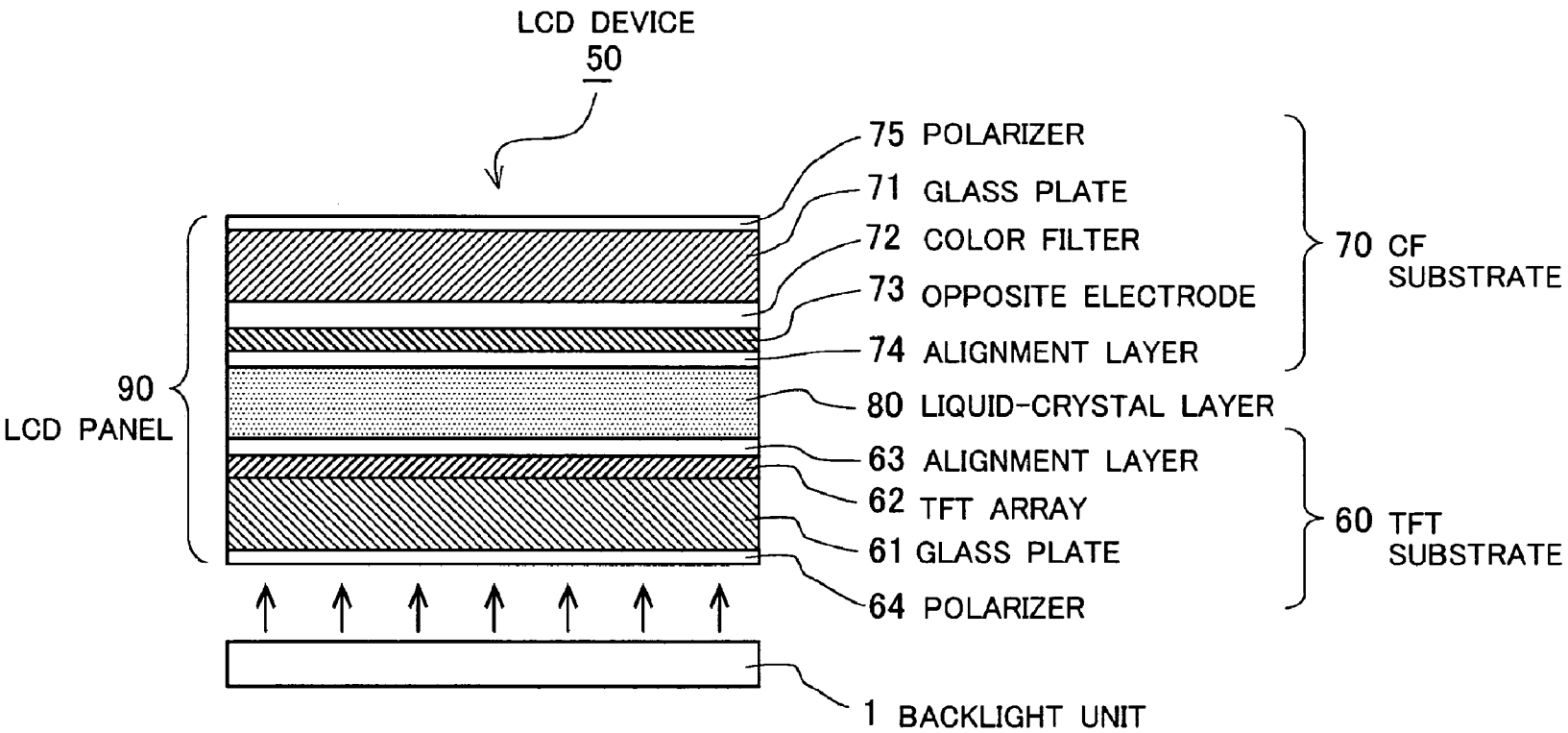
FIG. 7 is a schematic cross-sectional view showing the configuration of the main part of a LCD device according to a fifth embodiment of the present invention, which comprises the backlight unit according to the first embodiment of the invention.

FIG. 7 schematically shows the configuration of a LCD device 50 according to a fifth embodiment of the present invention. The LCD device 50 comprises a LCD panel 90 and the above-described backlight unit 1 according to the first embodiment.

The LCD panel 90 may have any one of the known configurations. Here, as shown in FIG. 7, the panel 90 comprises a TFT substrate 60, a CF (color filter) or opposite substrate 70, and a liquid-crystal layer 80 sandwiched by these two substrates 60 and 70.

The TFT substrate 60 comprises a glass plate 61, a TFT array 62 formed on the inner surface of the plate 61, an alignment layer 63 formed on the TFT array 62, and a polarizer 64 formed on the outer surface of the plate 61. The TFT array 62 includes pixel electrodes (not shown) arranged in a matrix array.

The CF substrate 70 comprises a glass plate 71, a color filter 72 formed on the inner surface of the plate 71, an opposite or common electrode 73 formed on the color filter 72, an alignment layer 74 formed on the opposite electrode 73, and a polarizer 75 formed on the outer surface of the plate 71.

Voltages are applied across the pixel electrodes in the TFT array 62 and the opposite electrode 73 with respect to the respective pixels. By switching the applied voltages using the TFTs in the TFT array 62, desired images are displayed on the screen.

With the LCD device 50 according to the fifth embodiment, since the backlight unit 1 according to the first embodiment is used, the color unevenness on the display screen can be effectively reduced.

The backlight unit 1 according to the first embodiment may be replaced with the backlight unit 1A, 1B, or 1C according to the second, third, or fourth embodiment described above.

VARIATIONS

The above-described first to fifth embodiments are preferred examples of the present invention. Therefore, it is needless to say that the present invention is not limited to these embodiments. Any other modification is applicable to the embodiments.

For example, in the above-described embodiments of the invention, the optical filters are selectively formed on the light exiting surface of the first light guide plate, the light incident surface or the light exiting surface of the second light guide plate, or the surface of the diffusing plate. However, two or more of these embodiments may be combined together according to the necessity. Specifically, the optical filters may be formed on the light incident surface of the second light guide plate and one surface of the diffusing plate, respectively. Alternately, the optical filters may be formed on the light exiting surface of the first light guide plate and one surface of the diffusing plate, respectively. Any other combination is applicable to the invention.

Moreover, in the above-described embodiments of the invention, the optical filters are selectively formed at or near each end of the light exiting surface of the first light guide plate, the light incident or exiting surface of the second light guide plate, or one surface of the diffusing plate. However, the invention is not limited to this. According to the color unevenness or deviation appearing in any area or areas other than the ends of the display screen, the optical filter or filters may be selectively formed on the light exiting surface of the first light guide plate, the light incident or exiting surface of the second light guide plate, or the diffusing plate.

In addition, a single LED unit is used for the backlight unit in the above-described embodiments of the invention. However, two or more LED units may be used in combination for the backlight unit.

Although parallel flat light guide plates are used for the first and second light guide plates in the above-described embodiments of the invention, any other type of the light guide plate, such as a wedge-shaped light guide plate, may be used for this purpose.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A backlight unit comprising:

at least one point-shaped light source unit having point-shaped light sources arranged in a single direction in a predetermined order, the light sources emitting monochromatic light of different colors;

a first light guide plate, which has a light incident surface and a light exiting surface, for receiving monochrome light emitted from respective light sources of the light source unit at the light incident surface and guiding said light to the light exiting surface;

a reflector for reflecting the light exiting from the light exiting surface of the first light guide plate;

a second light guide plate, which has a light incident surface and a light exiting surface, for receiving the light reflected by the reflector at the light incident surface of the second light guide plate and guiding said light to the light exiting surface of the second light guide plate;

a diffusing plate for receiving the light exiting from the light exiting surface of the second light guide plate, diffusing said light, and emitting said light diffused;

a first optical filter for limiting or controlling transmission of the monochromatic light emitted from one of the light sources disposed at one end of the light source unit; and a second optical filter for limiting or controlling transmission of the monochromatic light emitted from another of the light sources disposed at the other end of the light source unit, wherein the first optical filter and the second optical filter are selectively formed on one of the first light guide plate, the second light guide plate, and the diffusing plate, and wherein a base of said point-shaped light source unit is parallel to said light incident surface of the first light guide plate.

2. A backlight unit comprising:

at least one point-shaped light source unit having point-shaped light sources arranged in a single direction in a predetermined order, the light sources emitting monochromatic light of different colors;

a first light guide plate, which has a light incident surface and a light exiting surface, for receiving monochrome light emitted from respective light sources of the light source unit at the light incident surface and guiding said light to the light exiting surface;

a reflector for reflecting the light exiting from the light exiting surface of the first light guide plate;

a second light guide plate, which has a light incident surface and a light exiting surface, for receiving the light reflected by the reflector at the light incident surface of the second light guide plate and guiding said light to the light exiting surface of the second light guide plate;

a diffusing plate for receiving the light exiting from the light exiting surface of the second light guide plate, diffusing said light, and emitting said light diffused;

a first optical filter for limiting or controlling transmission of the monochromatic light emitted from one of the light sources disposed at one end of the light source unit; and a second optical filter for limiting or controlling transmission of the monochromatic light emitted from another of the light sources disposed at the other end of the light source unit, wherein the first optical filter and the second optical filter are selectively formed on one of the first light guide plate, the second light guide plate, and the diffusing plate, and wherein the first optical filter and the second optical filter are located on the light exiting surface of the first light guide plate.

3. The backlight unit according to claim 2, wherein the first optical filter and the second optical filter are respectively located at or near two ends of the light exiting surface of the first light guide plate, respectively.

4. A backlight unit comprising:

at least one point-shaped light source unit having point-shaped light sources arranged in a single direction in a predetermined order, the light sources emitting monochromatic light of different colors;

a first light guide plate, which has a light incident surface and a light exiting surface, for receiving monochrome light emitted from respective light sources of the light source unit at the light incident surface and guiding said light to the light exiting surface;

a reflector for reflecting the light exiting from the light exiting surface of the first light guide plate;

a second light guide plate, which has a light incident surface and a light exiting surface, for receiving the light reflected by the reflector at the light incident surface of the second light guide plate and guiding said light to the light exiting surface of the second light guide plate;

a diffusing plate for receiving the light exiting from the light exiting surface of the second light guide plate, diffusing said light, and emitting said light diffused;

a first optical filter for limiting or controlling transmission of the monochromatic light emitted from one of the light sources disposed at one end of the light source unit; and a second optical filter for limiting or controlling transmission of the monochromatic light emitted from another of the light sources disposed at the other end of the light source unit, wherein the first optical filter and the second optical filter are selectively formed on one of the first light guide plate, the second light guide plate, and the diffusing plate, and wherein the first optical filter and the second optical filter are located on the light incident surface of the second light guide plate.

5. The backlight unit according to claim 4, wherein the first optical filter and the second optical filter are respectively located at or near two ends of the light incident surface of the second light guide plate.

6. The backlight unit according to claim 1, wherein the first optical filter and the second optical filter are located on the light exiting surface of the second light guide plate.

7. The backlight unit according to claim 6, wherein the first optical filter and the second optical filter are respectively located at or near two ends of the light exiting surface of the second light guide plate.

8. The backlight unit according to claim 7, wherein the first optical filter and the second optical filter extend along the ends of the light exiting surface of the second light guide plate, respectively.

9. The backlight unit according to claim 1, wherein the first optical filter and the second optical filter are located on one surface of the diffusing plate.

10. The backlight unit according to claim 9, wherein the first optical filter and the second optical filter are respectively located at or near two ends of the surface of the diffusing plate.

11. The backlight unit according to claim 10, wherein the first optical filter and the second optical filter extend along the ends of the surface of the diffusing plate, respectively.

12. The backlight unit according to claim 1, wherein the light source unit comprises a single Light Emitting Diode (LCD) unit.

13. A liquid-crystal display device comprising:

the backlight unit according to claim 1; and a liquid-crystal display panel to which the light emitted from the backlight unit is to be irradiated.

14. The backlight unit according to claim 1, wherein the backlight unit comprises an edge-light type unit.

15. The backlight unit according to claim 1, wherein the first optical filter and the second optical filter are selectively formed on one of the first light guide plate or said light incident surface of the second light guide plate.

16. The backlight unit according to claim 1, wherein said point-shaped light sources comprise a different light color at each side of the point-shaped light source unit.

17. The backlight unit according to claim 13, wherein the first optical filter and the second optical filter are located on the light exiting surface of the first light guide plate.

18. The backlight unit according to claim 13, wherein the first optical filter and the second optical filter are selectively formed on one of the first light guide plate or said light incident surface of the second light guide plate.

19. A backlight unit comprising:

at least one point-shaped light source unit having point-shaped light sources arranged in a single direction in a predetermined order, the light sources emitting monochromatic light of different colors;

a first light guide plate, which has a light incident surface and a light exiting surface, for receiving monochrome light emitted from respective light sources of the light source unit at the light incident surface and guiding said light to the light exiting surface;

a reflector for reflecting the light exiting from the light exiting surface of the first light guide plate;

a second light guide plate, which has a light incident surface and a light exiting surface, for receiving the light reflected by the reflector at the light incident surface of the second light guide plate and guiding said light to the light exiting surface of the second light guide plate;

a diffusing plate for receiving the light exiting from the light exiting surface of the second light guide plate, diffusing said light, and emitting said light diffused;

a first optical filter for limiting or controlling transmission of the monochromatic light emitted from one of the light sources disposed at one end of the light source unit; and a second optical filter for limiting or controlling transmission of the monochromatic light emitted from another of the light sources disposed at the other end of the light source unit, wherein the first optical filter and the second optical filter are selectively formed on one of the first light guide plate or said light incident surface of the second light guide plate.

20. The backlight unit according to claim 19, wherein the backlight unit comprises an edge-light type unit, and wherein a base of said point-shaped light source unit is parallel to said light incident surface of the first light guide plate.

*21. A backlight unit comprising:*

*a first light guide plate;*

*a second light guide plate;*

*a diffusing plate;*

*a first optical filter for controlling transmission of monochromatic light emitted from one of a set of point-shaped light sources disposed at one end of a point-shaped light source unit; and*

*a second optical filter for controlling transmission of monochromatic light emitted from another of the set of point-shaped light sources disposed at another end of the point-shaped light source unit, wherein the first optical filter and the second optical filter are selectively formed on one of the first light guide plate, the second light guide plate, or the diffusing plate,*

*wherein a base of the point-shaped light source unit is substantially parallel to a light incident surface of the first light guide plate.*

*22. The backlight unit of claim 21, wherein the first optical filter and the second optical filter are respectively located on a light exiting surface of the second light guide plate.*

*23. The backlight unit of claim 22, wherein the first optical filter and the second optical filter are respectively located at or near two ends of the light exiting surface of the second light guide plate.*

*24. The backlight unit of claim 23, wherein the first optical filter and the second optical filter respectively extend along the two ends of the light exiting surface of the second light guide plate.*

*25. The backlight unit of claim 21, wherein the first optical filter and the second optical filter are located on a surface of the diffusing plate.*

*26. The backlight unit of claim 25, wherein the first optical filter and the second optical filter are respectively located at or near two ends of the surface of the diffusing plate.*

*27. The backlight unit of claim 26, wherein the first optical filter and the second optical filter extend respectively along the two ends of the surface of the diffusing plate.*

*28. The backlight unit of claim 21, wherein the point-shaped light source unit comprises a light emitting diode unit.*

*29. The backlight unit of claim 21, further comprising a liquid-crystal display panel configured to receive irradiated light from the set of point-shaped light sources.*

*30. The backlight unit of claim 21, wherein the backlight unit comprises an edge-type unit wherein the point-shaped light source unit is arranged along an edge of the first light guide plate.*

*31. The backlight unit of claim 21, wherein the first optical filter and the second optical filter are selectively formed on one of the first light guide plate or a light incident surface of the second light guide plate.*

*32. The backlight unit of claim 21, wherein the first optical filter and the second optical filter are located on a light exiting surface of the first light guide plate.*

*33. The backlight unit of claim 32, wherein the first optical filter and the second optical filter are respectively located at or near two ends of the light exiting surface of the first light guide plate.*

*34. The backlight unit of claim 21, wherein the set of point-shaped light sources comprises a different light color at respective sides of the point-shaped light source unit.*

*35. A backlight unit comprising:*

*a first light guide plate;*

*a first optical filter configured to limit or control transmission of monochromatic light emitted from one of a set of light sources disposed at one end of a light source unit; and*

*a second optical filter configured to limit or control transmission of monochromatic light emitted from another of the set of light sources disposed at another end of the light source unit,*

*wherein the first optical filter and the second optical filter are located on a light exiting surface of the first light guide plate.*

*36. The backlight unit of claim 35, wherein the first optical filter and the second optical filter are respectively located at or near two ends of the light exiting surface of the first light guide plate.*

*37. The backlight unit of claim 35, wherein the light source unit comprises a light emitting diode unit.*

*38. The backlight unit of claim 35, further comprising a liquid-crystal display panel configured to receive light emitted from the set of point-shaped light sources.*

*39. The backlight unit of claim 35, wherein the backlight unit comprises an edge-type unit wherein the light source unit is arranged alone, an edge of the first light guide plate.*

*40. The backlight unit of claim 35, wherein the set of light sources comprising a set of point-shaped light sources.*

*41. A backlight unit comprising:*

*a first light guide plate;*

*a second light guide plate;*

*a first optical filter configured to control transmission of monochromatic light emitted from one of a set of light sources disposed at one end of a light source unit; and*

*a second optical filter configured to control transmission of monochromatic light emitted from another of the set of light sources disposed at another end of the light source unit,*

*wherein the first optical filter and the second optical filter are located on a light incident surface of the second light guide plate.*

*42. The backlight unit of claim 41, wherein the first optical filter and the second optical filter are respectively located at or near two ends of the light incident surface of the second light guide plate.*

*43. The backlight unit of claim 41, wherein the light source unit comprises a light emitting diode unit.*

*44. The backlight unit of claim 41, further comprising a liquid-crystal display panel to which light emitted from the set of point-shaped light sources is to be irradiated.*

*45. The backlight unit of claim 41, wherein the backlight unit comprises an edge-type unit wherein the light source unit is arranged along an edge of the first light guide plate.*

*46. The backlight unit of claim 41, wherein the set of light sources comprises a set of point-shaped light sources.*

*47. A backlight unit comprising:*

*a first light guide plate;*

*a second light guide plate;*

*a first optical filter configured to limit transmission of monochromatic light emitted from one of a set of light sources disposed at one end of a light source unit; and*

*a second optical filter configured to limit transmission of monochromatic light emitted from another of the set of light sources disposed at another end of the light source unit,*

*wherein the first optical filter and the second optical filter are selectively formed on one of the first light guide plate or a light incident surface of the second light guide plate.*

*48. The backlight unit of claim 47, wherein the backlight unit comprises an edge-type unit, and*

*wherein a base of the light source unit is substantially parallel to a light incident surface of the first light guide plate.*

*49. The backlight unit of claim 47, wherein the light source unit comprises a single light emitting diode unit.*

*50. The backlight unit of claim 47, further comprising a liquid-crystal display panel to which light emitted from the set of light sources is to be irradiated.*

*51. The backlight unit of claim 47, wherein the backlight unit comprises an edge-type unit wherein the light source unit is arranged along an edge of the first light guide plate.*

*52. The backlight unit of claim 47, wherein the first optical filter and the second optical filter are located on a light exiting surface of the first light guide plate.*

*53. The backlight unit of claim 52, wherein the first optical filter and the second optical filter are respectively located at or near two ends of the light exiting surface of the first light guide plate.*

*54. The backlight unit of claim 47, wherein the set of light sources comprises a different light color at respective sides of the light source unit.*

*55. A method comprising:*

*receiving, at a light incident surface of a first light guide plate, first light emitted from a first light source disposed on a first end of a light source unit having a base that is substantially parallel to the light incident surface of the first light guide plate;*

*receiving, at the light incident surface of the first light guide plate, second light emitted from a second light source disposed on a second end of the light source unit;*

*guiding, by a second light guide plate, the first light and the second light to a diffusing plate;*

*controlling transmission of the first light by a first optical filter formed on one of the first light guide plate, the second light guide plate, or the diffusing plate; and*

*controlling transmission of the second light by a second optical filter formed on one of the first light guide plate, the second light guide plate, or the diffusing plate.*

*56. The method of claim 55, wherein:*

*the controlling transmission of the first light includes controlling transmission of the first light by the first optical filter located on a light exiting surface of the second light guide plate; and*

*the controlling transmission of the second light includes controlling transmission of the second light by the second optical filter located on the light exiting surface of the second light guide plate.*

*57. The method of claim 55, wherein:*

*the controlling transmission of the first light includes controlling transmission of the first light by the first optical filter located on a first end of a surface of the diffusing plate; and*

*the controlling transmission of the second light includes controlling transmission of the second light by the second optical filter located on a second end of the surface of the diffusing plate.*

*58. The method of claim 55, wherein the receiving the first light and the receiving the second light includes receiving the first light and the second light from a light emitting diode unit.*

*59. The method of claim 55, wherein:*

*the controlling transmission of the first light includes controlling transmission of the first light by the first optical filter located on a first end of a light exiting surface of the first light guide plate; and*

*the controlling transmission of the second light includes controlling transmission of the second light by the second optical filter located on a second end of the light exiting surface of the first light guide plate.*

*60. The method of claim 55, wherein:*

*the controlling transmission of the first light includes controlling transmission of the first light by the first optical filter located on a light incident surface of the second light guide plate; and*

*the controlling transmission of the second light includes controlling transmission of the second light by the second optical filter located on the light incident surface of the second light guide plate.*

*61. The method of claim 55, further comprising guiding the first light and the second light to a light exiting surface of the first light guide plate.*

*62. The method of claim 61, further comprising reflecting the first light and the second light from the light exiting surface of the first light guide plate to a light incident surface of the second light guide plate.*

*63. The method of claim 59, wherein the receiving first light and the receiving the second light includes receiving the first light and the second light emitted from a first point-shaped light source and a second point-shaped light source, respectively.*

*64. A system comprising:*

*means for receiving first light and second light from a first end and a second end, respectively, of a light source unit having a base that is substantially parallel to a light incident surface of the means for receiving the first light and the second light;*

*means for guiding the first light and the second light to a diffusing plate;*

*means for limiting or controlling transmission of the first light; and*

*means for limiting or controlling transmission of the second light,*

*wherein the means for limiting or controlling transmission of the first light and the means for limiting or controlling transmission of the second light are formed on one of the means for receiving the first light and the second light, the means for guiding, or the diffusing plate.*

* * * * *

UNITED STATES PATENT AND TRADEMARK OFFICE

CERTIFICATE OF CORRECTION

PATENT NO. : RE44,118 E
APPLICATION NO. : 13/245678
DATED : April 2, 2013
INVENTOR(S) : Nishigaki It is certified that error appears in the above-identified patent and that said Letters Patent is hereby corrected as shown below:

In the Specification:

In Column 7, Line 50, delete "LED 11a" and insert - - LED 11b - -, therefor.

In Column 7, Line 51, delete "LED 11a" and insert - - LED 11b - -, therefor.

In Column 10, Line 17, delete "light exiting surface 12" and insert - - light exiting surface 12b - -, therefor.

In Column 10, Lines 21-22, delete "light exiting surface 12," and insert - - light exiting surface 12b, - -, therefor.

In Column 10, Line 25, delete "light exiting surface 12" and insert - - light exiting surface 12b - -, therefor.

In Column 10, Lines 49-64, delete "With the backlight unit 1 according to the first embodiment of the invention shown in FIGS. 2 and 3, as explained above, the LED unit 11 with the LEDs 11b emitting red, green and blue light is provided. The green LED 11b is located at or near one end (i.e., the left-side end in FIG. 2) of the LED unit 11, and the red LED 11b is located at or near the other end (i.e., the right-side end in FIG. 2) thereof. All the LEDs 11b of the unit 11 are aligned along the light incident surface 12a of the first light guide plate 12. For this reason, if the optical filters 20a and 20b are not provided, green color will be excessive or stronger in one side of the display screen and at the same time, red color will be excessive or stronger in the other side thereof compared with the remaining region (i.e., the central part) of the screen in accordance with the placement order of the LEDs 11b in the LED unit 11. As a result, color unevenness or color deviation will occur on the screen." and insert the same at line 49 as a new paragraph, therefor.

In the Claims:

In Column 16, Lines 21-22, in Claim 12, delete "Light Emitting Diode (LCD)" and insert - - Light Emitting Diode (LED) - -, therefor.

In Column 18, Line 32, in Claim 39, delete "alone," and insert - - along - -, therefor.

Signed and Sealed this
Seventeenth Day of September, 2013

Teresa Stanek Rea
*Deputy Director of the United States Patent and Trademark Office*